Oct. 25, 1966  F. A. STORMS  3,280,765
RETRACTIBLE INSTRUMENT PANEL TRAY
Filed June 23, 1965
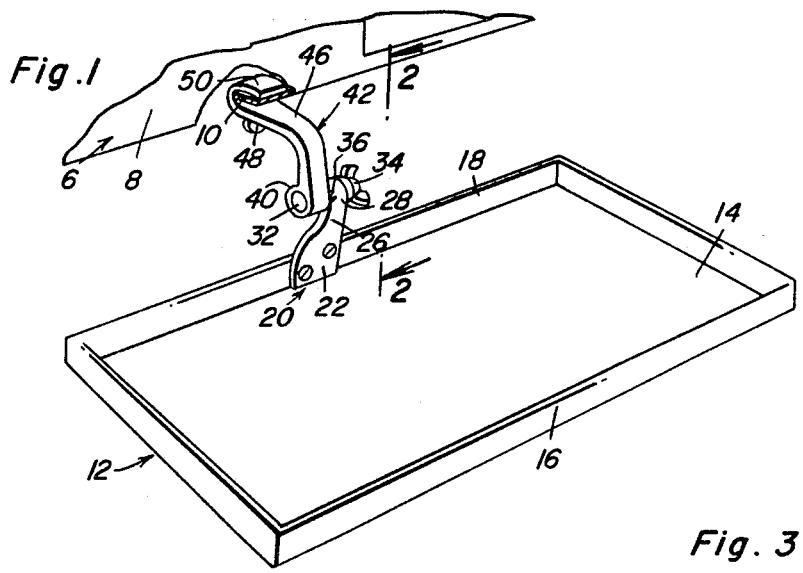
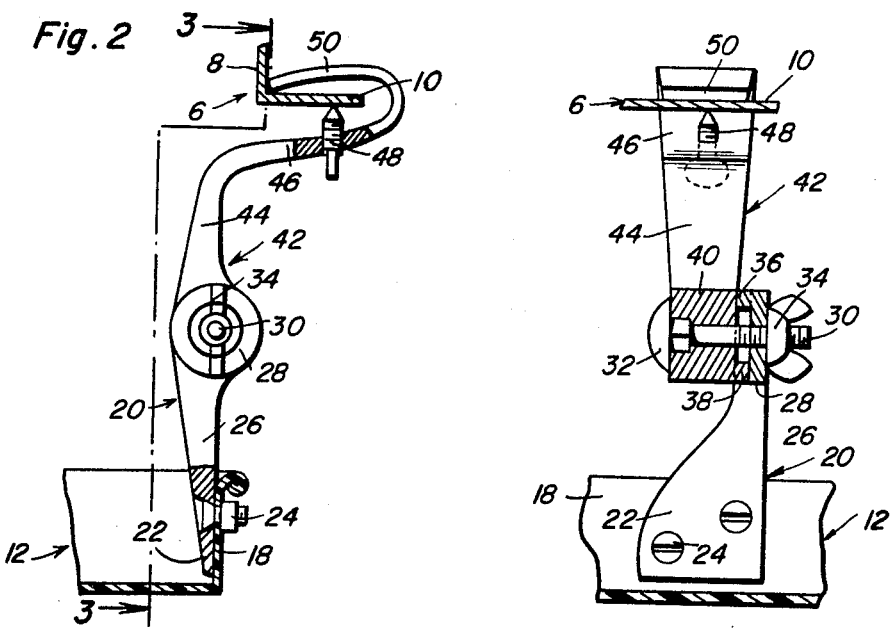
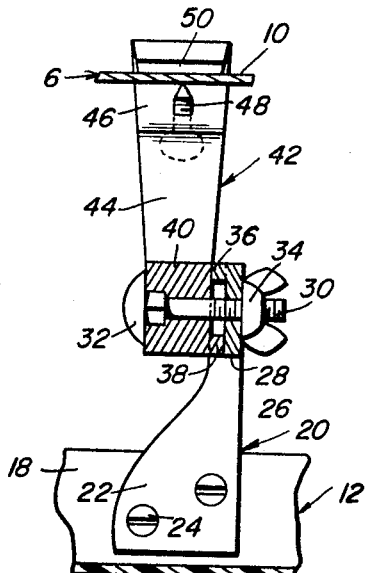
Frederick A. Storms
INVENTOR.
BY Clarence A. O'Brien
and Harvey B. Jackson
Attorneys

United States Patent Office 3,280,765
Patented Oct. 25, 1966

3,280,765
RETRACTIBLE INSTRUMENT PANEL TRAY
Frederick A. Storms, Bradford, Pa., assignor of fifty
percent to Lucille E. Storms, Bradford, Pa.
Filed June 23, 1965, Ser. No. 466,280
3 Claims. (Cl. 108—45)

The present invention relates to a tray which is capable of being aptly and satisfactorily used within the often limited confines of an automobile and which is feasible and serviceable while seated and eating or drinking, which will be firm and steady while in use and which can be conveniently swung to an out-of-the way position when not in use.

Multipurpose and utility-type extensible and retractible trays and shelves for interior automobile use are not new. Many and varied styles and forms of such trays have been devised and offered for use but for one reason or another have not met with widespread adoption and use. In fact, it is old in the art to suspend the foldaway tray so that it can be attached to and hung from a presently available horizontal flange at the bottom of the automobile's instrument panel. This is accomplished through the use of an adaptable means such as, for example, that shown in an example patent to Trammell 2,510,436. An objective of the present invention compared to the stated patent and other known art is to simplify the bracketing or attaching means and, in carrying out this aim to utilize an adaptation which is made of fewer and less complicated component parts and which, under the circumstances better and well serve the purposes for which it is intended. Whereas, for example, two tightening devices are required to position the Trammell tray the present invention is characterized by simplified bracketing means which has a more positive and secure arrangement and wherein the parts are such that they are not only available but do not require the use of tools. It follows that the herein disclosed adaptation can be operated by persons with little or no mechanical skill and with less chance of trouble resulting from mechanical difficulties.

Then, too, experience has shown that in most automobiles it is quite difficult to find a suitable place for mounting the attaching bracket for the tray. In carrying out the present invention the bracketing means used in such that one can cope with the difficulty stated. The bracket means can be installed without using any tools and the simplified and lesser number of component parts will enable one to cope with difficulties such as would be encountered in the utilization of expedients which require precision machine or are likely to promote exasperating time delays and engendering other difficulties.

Briefly in carrying out the present invention a greatly simplified and easy-to-install dual unit bracket is offered. One unit is simply bolted to the rim of the tray. The other unit has an L-shaped body portion and an attaching hook with a set-screw and the adjacent ends of the two units have terminal heads with faces opposed and bolted to each other, said faces being serrated or otherwise provided with radial ribs to thus provide a quick and easy-to-use clamp, in fact, one wherein the units can be parted from each other and allowed to remain in their positions, say one on the instrument panel and the other on the tray if and when desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a swing-away type serving tray suitable for use in an automobile and detailing the construction of the bracketing means and how the same is designed and adapted to be mounted when in use;

FIGURE 2 is a section on a larger scale with parts in section and elevation taken approximately on the plane of the vertical section line 2—2 of FIGURE 1; and FIGURE 3 is a section taken on the plane of the section line 3—3 of FIGURE 2.

Referring now to the views of the drawing the automobile or equivalent vehicle instrument panel is denoted by the numeral 6 and comprises the vertical body portion 8 and forwardly directed lateral flange portion 10 with which the bracketing means is connectible. The tray is of a shallow pan-like construction and is denoted generally by the numeral 12 having a flat bottom 14 and a surrounding upstanding marginal rim 16. The bracketing means in the instant situation is joined to a median portion of the rim component 18. The bracketing means is actually a simple two-part bracket construction. The lower part or unit is denoted by the numeral 20 and it comprises an arm or blade-like portion 22 which is superimposed on the rim part 18 and is screwed or otherwise detachably bolted thereto as at 24. The blade gradually narrows into a vertical shank portion 26 which terminates in a generally circular head portion 28 whose face is serrated or otherwise ribbed to provide a gear-like jaw, said jaw having a central hole for the shank 30 of the assembling and clamping bolt 32. In keeping with the principles of this invention the threaded end portion passes through the aperture in the head where it is provided with a thumb nut 34. The radial teeth 36 on this head are opposed to cooperating radial teeth 38 on a similar head portion 40 which is an integral part of the body of the second bracket unit denoted by the numeral 42. This unit is an independent part and has an L-shaped body portion which includes a vertical limb or arm 44 and complemental limb 46 the latter provided with a setscrew 48 and terminating in a return-bent hook 50 which constitutes an adapter and which in conjunction with the setscrew makes it possible to satisfactorily apply and attach the hook to the supporting flange 10. The head portion 40 has a bolt hole therethrough through which the shank of the aforementioned bolt 32 passes in the manner shown in the views of the drawing to adjustably and separably join the ribbed head portions to each other in the manner and for the purposes described.

Whereas it is sometimes difficult to find one relatively small and suitable place for securing the anchoring and bracketing means on prior art devices, it will be evident that with the construction here shown the L-shaped body portion of the bracket unit 42 and the setscrew and hook arrangement makes it possible to readily and securely install the bracket unit 42 and after it has been positioned, to then bring the tray 12 and its bracketing unit 20 into position and simply line up and bolt the parts together. In fact with the construction shown it will be evident that the tray can be installed in an automobile without using any tools and fewer and simpler component parts will reasonably well assure the user that he will have little difficulty in installing the tray, removing it bodily if desired, or stowing it away when it is not to be used. The bolting and hinging means brought out in FIGS. 2 and 3 in particular ensure the provision of an easily adjustable and positive clamping action which reduces the likelihood of slippage to a minimum.

In practice it will be evident that the upper bracket or unit 42 is attached to the flange 10 with the L-shaped portion depending at a place somewhere near the point of use of the user, say, for example, an occupant of the front seat. The tray will be shallow, longer or shorter depending on the particular make of automobile in which it is to be used. In fact, by having the unit 20 secured to the tray 12 it will be seen that a selection of types and colors and sizes can be employed with the bracket unit 20 being certain that it will mate properly with the companion bracket unit 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an upstanding vehicle panel including a laterally directed flange portion adjacent its lower end, and a retractible tray assembly, said tray assembly including a tray member defining peripheral edge portions and a support bracket for said tray member, said support bracket including a pair of elongated arms pivotally connected together at one pair of end portions for relative swinging movement about an axis extending transversely of said arms and including means releasably securing said arms in adjusted rotated positions, means securing the other free end portion of one of said arms to one marginal edge portion of said tray member, the other free end portion of the other arm including a laterally directed portion projecting outwardly therefrom in a direction generally normal to a plane containing said other arm and said axis and terminating in a reversely bent portion curving away from the pivotally supported end of said other arm and back in the opposite direction in spaced relation to said laterally directed portion defining, between the latter and said reversely bent portion, a pocket opening toward and in which said flange portion is removably received, and a setscrew threadedly passed through said laterally directed portion and cooperating with said reversely bent portion to removably clampingly secure said other arm to said flange portion, said setscrew including a finger engageable portion on the end thereof projecting from the side of said laterally directed portion remote from said reversely bent portion and being spaced sufficiently from said other arm to enable said finger-engageable portion to be readily grasped by a person disposed on the side of said panel remote from said flange portion.

2. The combination of claim 1 wherein said tray member projects laterally of the side of said one arm remote from said laterally directed portion when the other pair of corresponding end portions of said arms project in opposite directions.

3. The combination of claim 2 wherein said one marginal edge portion of said tray member includes a laterally directed rim portion to which said one arm is secured with said other free end portion thereof overlying the inner surface of said rim portion.

References Cited by the Examiner
UNITED STATES PATENTS

| | | | |
|---|---|---|---|
| 926,426 | 6/1909 | Koch | 248—291 X |
| 1,723,238 | 8/1929 | Hoot | 108—44 |
| 1,995,656 | 3/1935 | Stout | 248—291 |
| 2,270,948 | 1/1942 | Howe | 108—45 |
| 2,475,202 | 7/1949 | Sammons | 108—45 |
| 2,574,250 | 11/1951 | Dalton. | |
| 2,597,330 | 5/1952 | Huddleston | 108—45 |
| 2,799,697 | 7/1957 | Molinari | 108—45 |
| 3,023,063 | 2/1962 | Hansen | 108—44 |
| 3,190,241 | 6/1965 | Rodgers et al. | 108—45 |

FRANK B. SHERRY, *Primary Examiner.*

G. O. FINCH, *Assistant Examiner.*